Oct. 20, 1970   E. W. LORENCE   3,534,636
SPEED REDUCING TRANSMISSION
Filed April 12, 1968   4 Sheets-Sheet 1
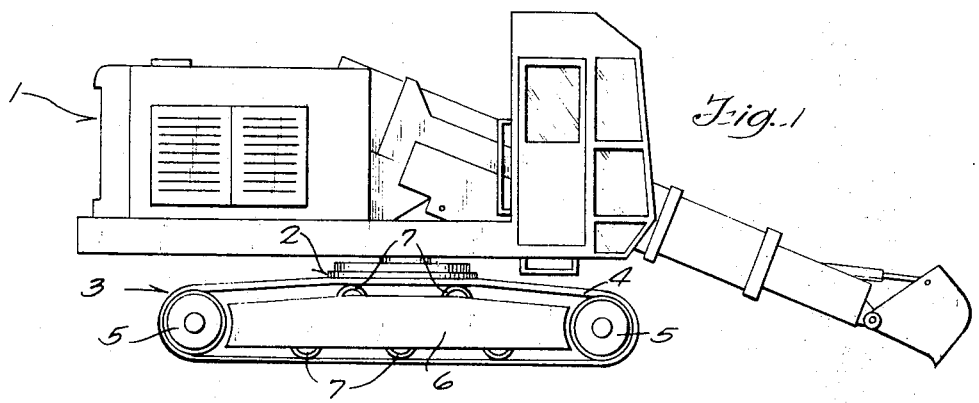
Fig. 1
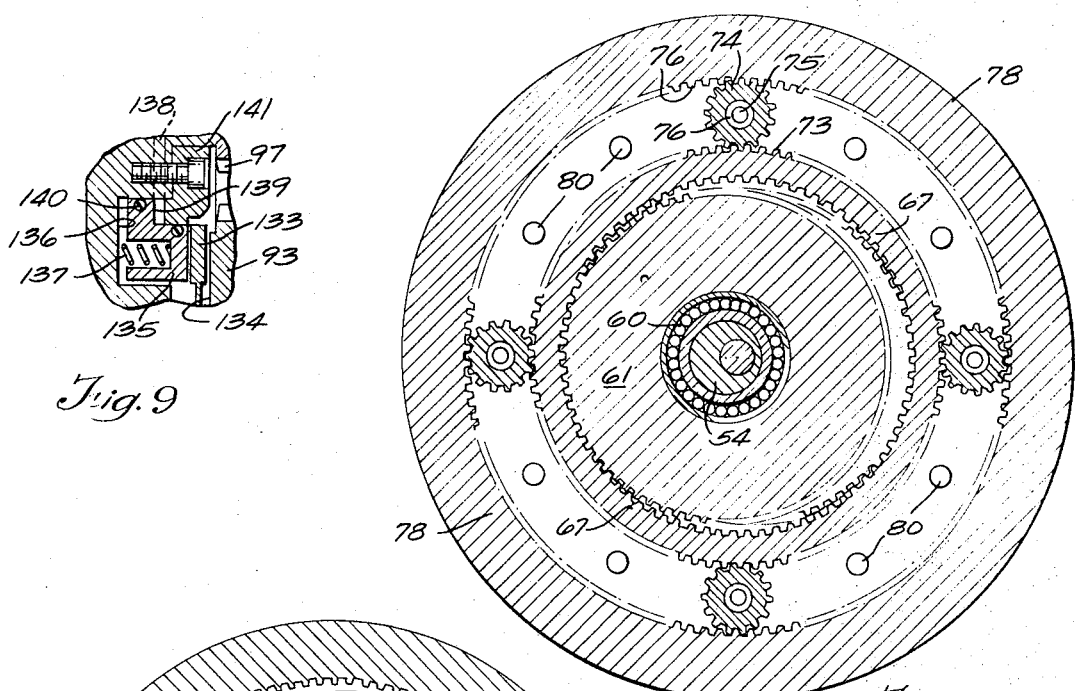
Fig. 9
Fig. 5
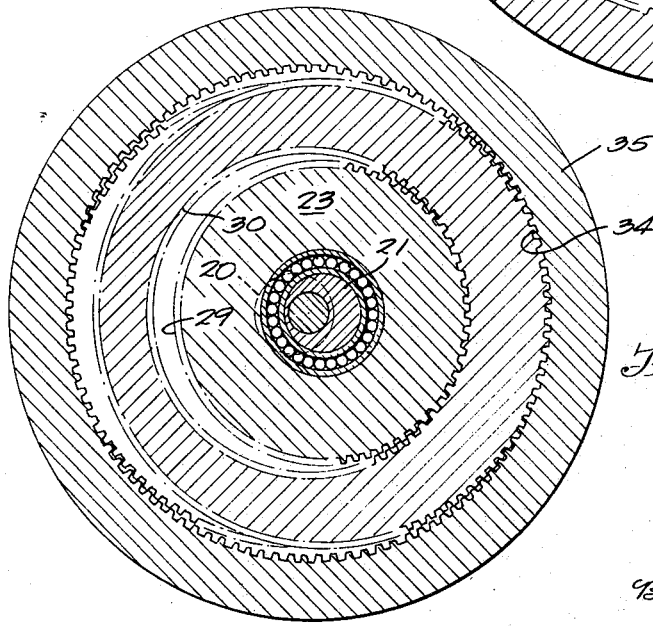
Fig. 3
Inventor
Erwin W. Lorence
By Andrus & Starke
Attorneys Oct. 20, 1970  E. W. LORENCE  3,534,636

SPEED REDUCING TRANSMISSION

Filed April 12, 1968  4 Sheets-Sheet 2

Inventor
Ervin W. Lorence
By Andrus & Starke
Attorneys

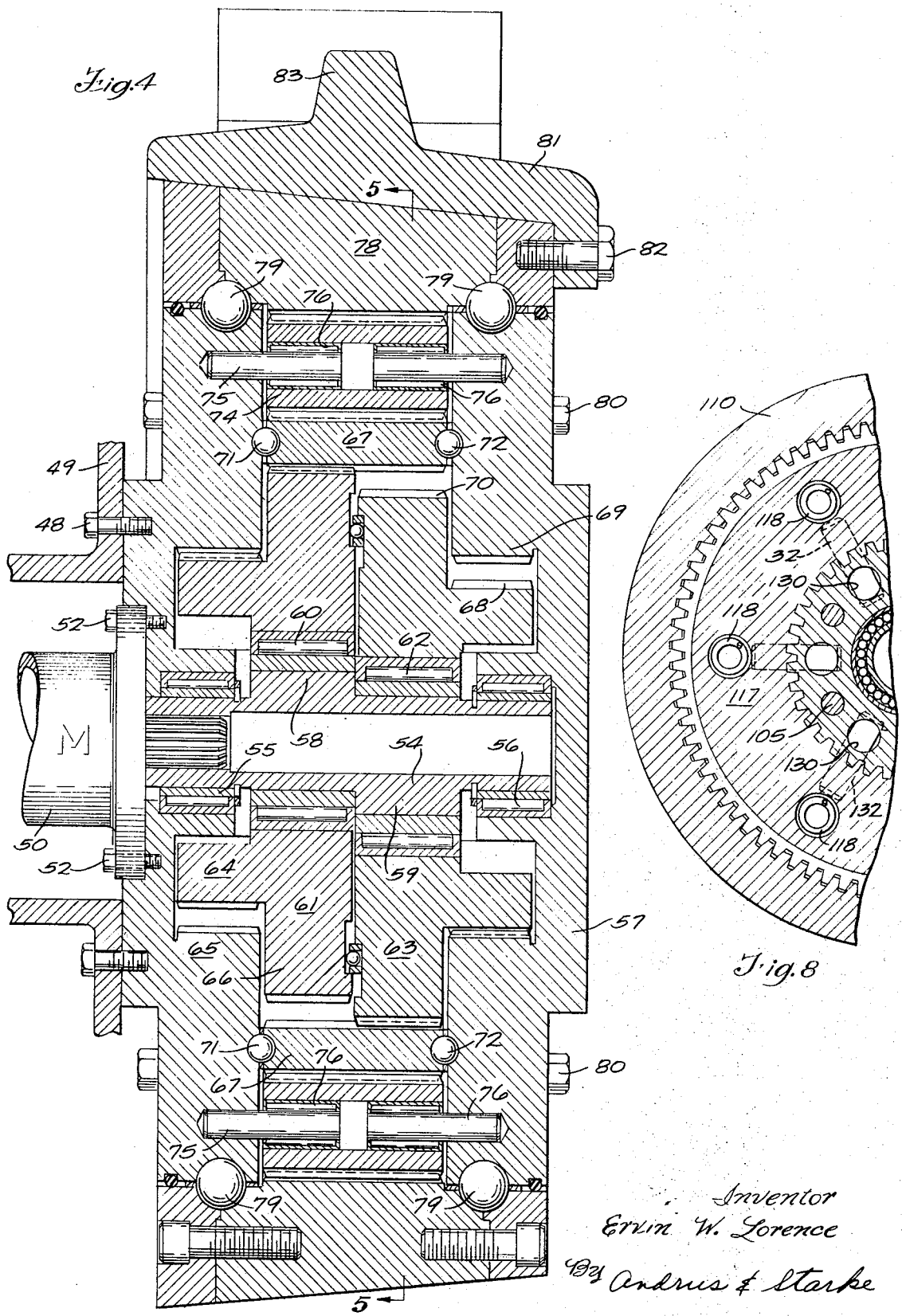

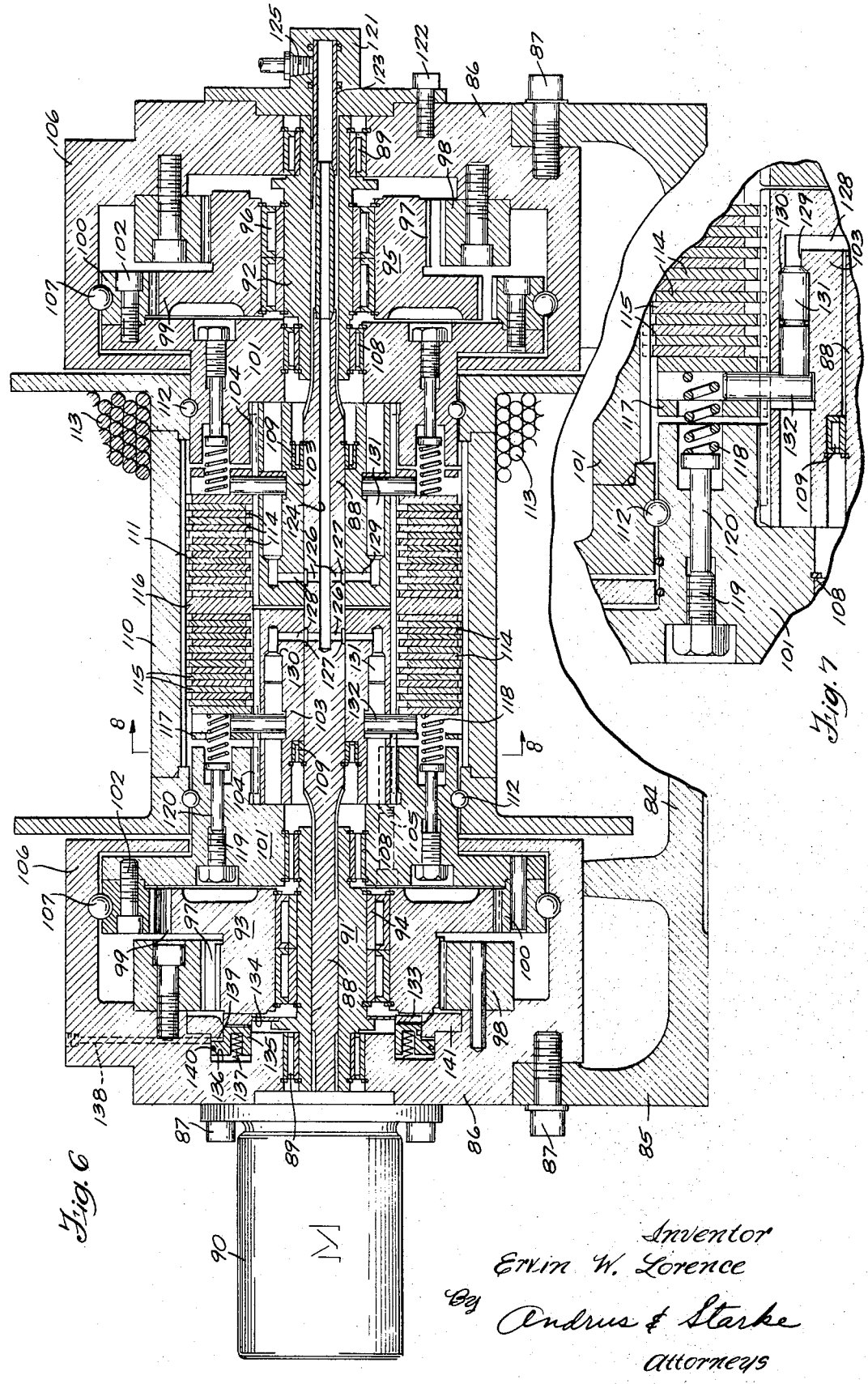

United States Patent Office 3,534,636
Patented Oct. 20, 1970

1

3,534,636
SPEED REDUCING TRANSMISSION
Ervin W. Lorence, Cedarburg, Wis., assignor to Lorence Manufacturing Corp., Milwaukee, Wis., a corporation of Wisconsin
Filed Apr. 12, 1968, Ser. No. 720,908
Int. Cl. F16h *1/28*
U.S. Cl. 74—805           13 Claims

ABSTRACT OF THE DISCLOSURE

The invention relates to a speed reducing drive unit for a rotating element. A hydraulic motor drives a shaft carrying a pair of eccentrics which are displaced angularly from each other. Each eccentric drives a floating gear unit, including an inner gear and an outer gear, and the inner gear of each unit meshes with a fixed gear ring, while the outer gear of both units drives a rotatable gear ring attached to the output member. Each gear has a lesser number of teeth than the corresponding gear ring and as the gear units are rotated by the eccentric, a two-stage speed reduction is provided to drive the output member at a substantially reduced rate of speed.

---

In one type of speed reducing unit used in the past floating gear units have been incorporated. In a unit of this type, the input shaft is connected to an eccentric which rotates within an opening in a floating gear unit. The gear unit includes an inner smaller gear and an outer larger gear with one of the gears being engaged with a fixed gear ring, while the other gear engages a rotatable gear ring connected to the output member. Each gear has a lesser number of teeth than the corresponding gear ring, and as the eccentric rotates, the gear unit is moved by a wedging action in the opposite direction and at a slower rate of speed than the eccentric. In addition, the rotatable gear ring will be moved by a wedging action at a slower rate of speed than the gear unit to provide a second speed reduction and thereby drive the output member at a substantially reduced rate of speed.

Speed reducing units of this type have been applied to drive the turntable of heavy construction equipment, as disclosed in patent application Ser. No. 509,031, now Pat. No. 3,369,672 filed Nov. 22. 1965, and have also been adapted to drive the tread for heavy construction equipment, such as cranes, bulldozers, and the like, as disclosed in patent application Ser. No. 600,117, now Pat. No. 3,429,393 filed Dec. 8, 1966. However, due to the fact that an eccentric drive is incorporated, the unit may tend to vibrate at high r.p.m. so that a drive mechanism of this type has generally been used in the past for slow speed applications, usually below 800 r.p.m.

The present invention is directed to a speed reducing drive unit incorporating a floating gear unit which is capable of operating at high speeds without vibration. According to the invention, the input shaft carries a pair of eccentrics which are displaced angularly approximately 180° from each other. Each eccentric drives a floating gear unit, including an inner gear and an outer gear, with the inner gear of each unit meshing with a fixed gear ring, while the outer gear of both units drives a rotatable gear ring attached to the output member, which can be a turntable of heavy construction equipment or a sprocket wheel of a crawler drive.

Each gear has a lesser number of teeth than the corresponding gear ring and as the eccentric rotates, the gear unit is moved at a slower rate of speed in the opposite direction to provide a first speed reduction, and the floating gear unit drives the output member in the opposite direction and at a still slower rate of speed to provide a second speed reduction.

The speed reducing mechanism of the invention incorporating a plurality of eccentrics reduces the vibration of the unit and enables the unit to be operated at high speeds up to 2500 r.p.m.

The drive mechanism provides a substantial speed reduction from the hydraulic motor to the output member with a minimum number of parts. By decreasing the number of parts, the overall cost of the speed reducing mechanism is reduced over that of conventional types.

The use of a plurality of eccentrics and floating gear rings results in the rotatable output member having a greater tooth depth and yet the overall depth of the unit is less, providing a more compact mechanism.

Moreover, the number of gear teeth in engagement with the output gear ring is increased by utilizing a pair of eccentrics, and this increases the load capacity of the drive mechanism.

The drive mechanism is particularly adaptable for driving the sprocket wheels of an endless tread and when used in this capacity, the drive mechanism can be installed as a packaged unit without boring the cam frame to mount bearings of the transmission, as required for the conventional drive mechanism. Moreover, the drive mechanism is highly versatile and drive wheels or sprockets of different sizes and shapes can be readily mounted on the unit to accommodate various types of treads.

Other objects and advantages will appear in the course of the following description.

The drawings illustrate the best mode presently contemplated of carrying out the invention.

In the drawings:

FIG. 1 is a side elevation of a conventional backhoe employing the drive mechanism of the invention for driving the tread;

FIG. 3 is a section taken along line 3—3 of FIG. 2;

FIG. 4 is a horizontal section showing a modified form of the drive wheel mechanism of the invention;

FIG. 5 is a section taken along line 5—5 of FIG. 4;

FIG. 6 is a longitudinal section of a winch assembly utilizing the drive mechanism of the invention;

FIG. 7 is an enlarged longitudinal section of the clutch release mechanism;

FIG. 8 is a section taken along line 8—8 of FIG. 7, and

FIG. 9 is an enlarged fragmentary longitudinal section of the braking device.

Figure 2:
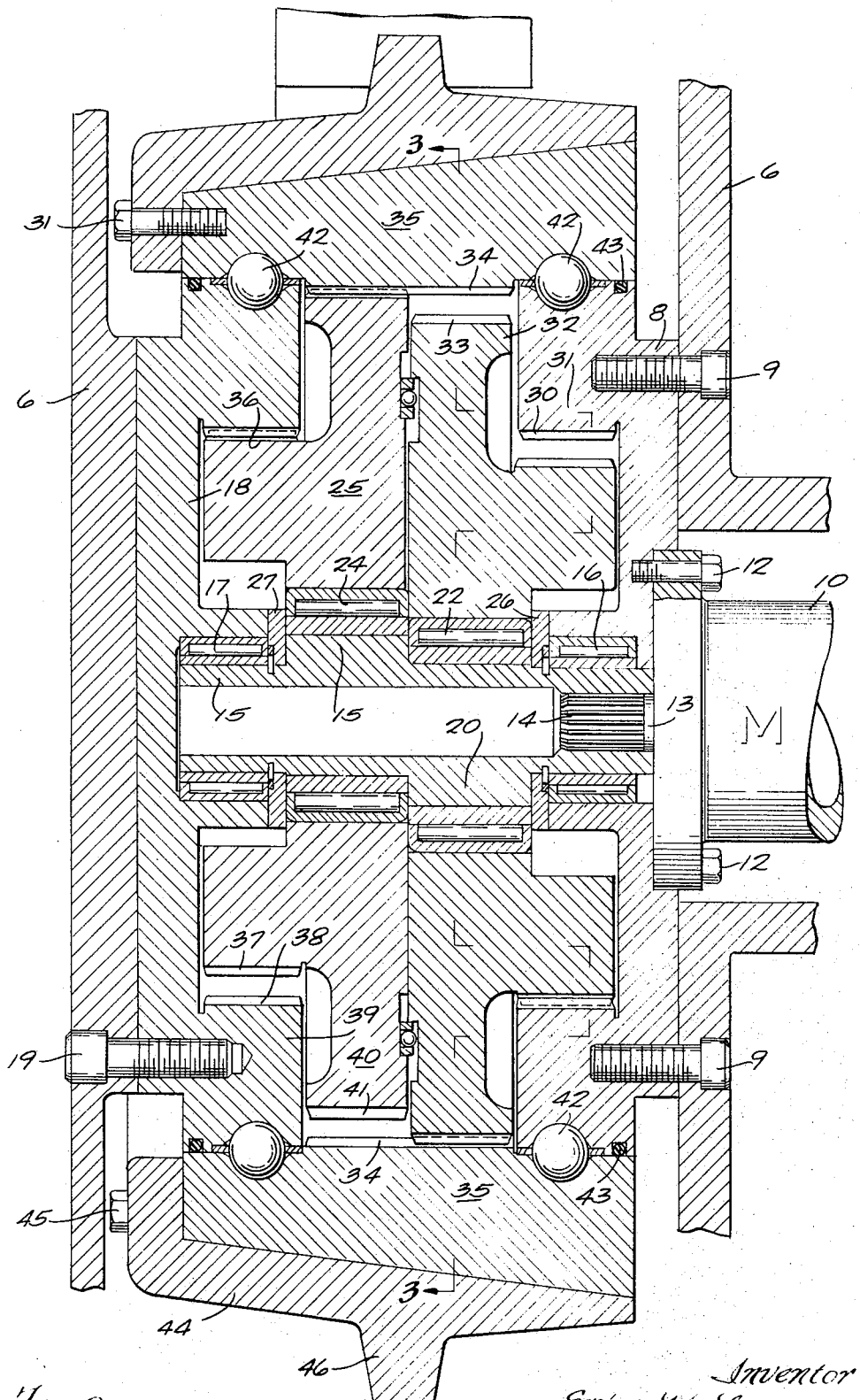
FIG. 2 is a horizontal section showing the drive wheel mechanism of the invention.

As shown in FIGS. 1–3, the drive unit of the invention, is incorporated with a conventional backhoe. The backhoe includes a cab and engine unit 1 supported on the turntable 2 which is mounted for rotation on a tread unit 3. The tread unit 3 comprises a pair of endless treads 4, and each tread 4 is driven by a pair of drive wheel assemblies 5 mounted on the frame 6 of the tread unit. In addition, each endless tread 4 is supported at positions throughout its length by a series of idler wheels 7.

As best shown in FIG. 2, the drive wheel assembly 5 includes an inner casing 8 which is secured to the frame 6 by a series of bolts 9. A reversible hydraulic motor 10 is mounted directly on the casting 8 through a base plate 11 which is secured by bolts 12 to the casting 8.

The outer end of motor drive shaft 13 is splined, as indicated by 14, to the end of a horizontal shaft 15. To mount the shaft for rotation, the inner end of the shaft is journaled within a bearing assembly 16 carried by the casting 8, and the outer end of the shaft 15 is journalled within a bearing assembly 17 carried by the outer casting 18.

With the drive unit shown in FIGS. 1–3, the frame 6 extends over the tread 4 and the outer casting 18 is also secured to the frame 6 by a series of bolts 9.

According to the invention, the shaft 15 carries a pair of eccentrics 20 and 21 which are displaced angularly approximately 180° apart, as best shown in FIG. 3. This means that the maximum radial distance between the center of rotation of eccentric 20 and its outer peripheral surface is located approximately 180° from the maximum radial distance between the center of rotation of eccentric 21 and its outer peripheral surface. The eccentric 20 is journalled by a bearing assembly 22 within the central opening in a floating gear unit 23, while the eccentric 21 is similarly journalled by bearing assembly 24 within a central opening in the floating gear unit 25.

In addition to the roller bearing assemblies 16 and 17, thrust bearings 26 and 27 are positioned at the ends of the eccentrics 20 and 21, respectively.

The floating gear unit 23 includes an inner gear 28 having a series of teeth 29 which mesh with the teeth 30 of a fixed gear ring 31 formed integrally with the inner casting 8. As the eccentric 20 rotates, the gear 28 is moved by the eccentric at a reduced speed and in the opposite direction of the rotation of the eccentric by a wedging type of action.

While the shape of the teeth 29 and 30 is not critical, the teeth are of identical shape and size. The gear ring 31 has a greater number of teeth than the gear 28 and thus the external diameter of the gear 28 is substantially smaller than the internal diameter of the gear ring 31. Due to the difference in the number of teeth, only about 10 or 12 teeth of the gear 28 are in engagement with the teeth 30 of the gear ring 31 at any time during rotation of the floating gear unit 23.

The floating gear unit 23 is also provided with an outer gear 32 having a series of teeth 33 which mesh with the teeth 34 of a rotatable, outer gear ring 35. The teeth 33 and 34 are identical in size and shape to each other and are also identical in size and shape to the teeth 29 and 30. There are a lesser number of teeth 33 than teeth 34, and the difference between the number of teeth is the same as the difference in number of teeth between the teeth 29 and 30. For example, if there are 85 teeth 34 and 82 teeth 33, a difference of 3, there can be 40 teeth 30 and 37 teeth 29, also a difference of 3.

As the outer gear 32 is formed integrally with the inner gear 28, the gear 32 will rotate with the gear 28 and the gear ring 35 will slip or move by a wedging action in the opposite direction to provide a second speed reduction.

The floating gear 25 is similar to floating gear 23 and includes an inner gear 36 having a series of teeth 37 which engage the teeth 38 of gear ring 39 which is formed integrally with the outer casting 18. As in the case of teeth 29 and 30, the teeth 37 and 38 are identical in size and shape to each other and are also identical in size and shape to the teeth 29 and 30. In addition, the difference in teeth between the gear 37 and the gear ring 38 is the same as the difference in number of teeth between the gear 28 and the gear ring 31.

The floating gear unit 25 is also provided with an outer gear ring 40 having a series of teeth 41 which engage the teeth 34 of the outer rotatable gear ring 35. Teeth 41 are similar in size and shape to the teeth 33 and 34, and there are the same number of teeth 41 on gear 40 as there are teeth 33 on the gear 32. Thus, the difference in number of teeth between the teeth 41 of gear 40 and the teeth 34 of gear ring 35 will be the same as the difference in number of teeth between the teeth 33 of gear 32 and the teeth 34 of gear ring 35.

The floating gear ring unit 25 acts in a manner similar to that of gear unit 23. As the eccentric 21 rotates, the gear 36 will be moved in the opposite direction and at a reduced rate of speed by a wedging type of action. As the outer gear 40 is connected integrally with the gear 34, gear 40 will act to move the rotatable gear ring 35 in the opposite direction and at a further reduced rate of speed.

The outer gear ring 35 is journalled for rotation about the castings 8 and 18 by a pair of ball bearing assemblies 42, and seals 43 are located between the respective castings 8 and 18 and the gear ring 35 to prevent entry of foreign material to the bearing assemblies 42.

A drive sprocket 44 is secured to the rotatable gear ring 35 by a series of bolts 45 and the gear ring 35 and the sprocket wheel 44 have cooperating inclined surfaces which provide a tight wedging engagement between the members. The sprocket wheels 44 are conventional in structure and include a series of drive pins 46 adapted to engage grooves in the endless treads 4. The shape and structure of the sprocket wheels, drive pins and treads can vary, depending on the particular requirements and type of construction equipment involved.

The interior chamber, defined by the base casting 8, and outer casting 18, is adapted to contain oil or other lubricating medium, which serves not only to lubricate the bearings, but also to lubricate the meshing teeth of the gears. Suitable oil passages, not shown, are formed in the base casting 8 for supplying oil to the interior for lubrication purposes.

As the eccentrics 20 and 21 are displaced diametrically of each other, the forces involved in the drive are balanced with the result that vibrations are substantially reduced and the drive mechanism can be operated at higher speeds than conventional units. As a further advantage, a greater number of teeth are engaged with the output gear ring 35 at any one time, due to the fact that both the teeth 33 of gear 32 and the teeth 41 of gear 40 are both engaged with the gear ring 35 at any one time. This enables the unit to withstand substantially greater loads in service without any increase in dimension or size of the unit.

FIGS. 4 and 5 illustrate a modified form of the invention in which the drive unit is anchored or supported only at one side, while in the embodiment shown in FIGS. 1–3, the drive unit was anchored to the frame 6 through both the inner casting 8 and the outer casting 18. Referring to FIG. 4, the drive mechanism includes an inner casting 47 which is secured by bolts 48 to the frame 49 of the tread unit which corresponds to the frame 6 in the first embodiment. A reversible hydraulic motor 50 is mounted directly on the casting 47 through the base plate 51, and a series of bolts 52 extend through the base plate and are connected to the casting 47.

The drive shaft 53 of motor 50 is connected by a spline connection within the interior of the hollow shaft 54, which corresponds to the shaft 15 of the first embodiment. The inner end of shaft 54 is journalled within a bearing assembly 55 mounted in the inner casting 47, while the outer end of shaft 54 is journalled within a bearing assembly 56 mounted in the outer casting 57.

As in the case of the first embodiment, the shaft 54 carries a pair of eccentrics 58 and 59 which are displaced diametrically opposite of each other. Eccentric 58 is journalled by a bearing assembly 60 within the central opening of a floating gear unit 61, while eccentric 59 is similarly journalled by bearing assembly 62 in the central opening of a floating gear unit 63.

The floating gear unit 61 is similar in structure to gear unit 23 and includes an inner gear 64 which engages the fixed gear ring 61 formed integrally with the casting 47. In addition, gear unit 61 is provided with an outer gear 66 which engages with the rotatable gear ring 67. As previously described, the teeth on the gears 64 and 66, and gear rings 65 and 67 are identical in size and shape, but the gears 64 and 66 have a lesser number of teeth than the corresponding gear rings 65 and 67.

The floating gear unit 63 is similar to gear unit 61 and is provided with an inner gear 68 which engages a fixed gear ring 69 formed integrally with the outer casting 57.

In addition, the gear unit 63 has an outer gear 70 which engages the internal teeth of the gear ring 67. As previously mentioned with respect to the first embodiment, the gears 68 and 70 and the gear rings 69 and 67 have teeth of identical size and shape, but the gears 68 and 70 have a lesser number of teeth than the corresponding gear rings.

As best shown in FIG. 4, the gear ring 67 is mounted for rotation between the inner casting 47 and the outer casting 57 by a pair of ball bearing assemblies 71 and 72.

Formed on the external surface of ring 67 are a series of teeth 73 which engage and drive a series of pinions 74. Pinions 74, as best shown in FIG. 5, are spaced approximately 90° apart and each pinion is journalled on a spindle or shaft 75 by bearing assemblies 76. The pinions 74 are engaged with the teeth 77 of an outer gear ring 78, and the gear ring 78 is journalled for rotation about the fixed castings 47 and 57 by ball bearing assemblies 79.

As previously mentioned, the embodiment shown in FIGS. 4 and 5 is adapted to be used when the drive unit is supported or anchored from only one side. Thus the outer casting 57 is secured to the inner casting 47 by a series of bolts 80 which are located between the pinions 74. By utilizing the pinions 74 to connect the ring 67, the bolts 80 can extend through the drive mechanism to connect the outer casting 57 to the inner casting 47. Without the use of the pinions 74, there would be no space or clearance through which connecting members could pass to connect the outer casting 57 to the inner casting 47.

The use of the pinions 74 provides a further advantage in that it substantially increases the load capacity of the unit, due to the fact that the load is carried up by a series of pinions rather than by a series of teeth of one gear ring, as in the embodiment shown in FIGS. 1–3.

As in the case of the first embodiment, a sprocket wheel 81 is connected to the outer gear ring 78 by a series of bolts 82 and the sprocket wheel is provided with a series of drive pins 83 adapted to engage and drive the endless tread 4 in a conventional manner.

FIGS. 6–9 illustrate a modified form of the invention in which the speed reducing unit is incorporated in a power driven winch. The winch includes a base 84 having a pair of end plates 85 which extend outwardly from the base in spaced relation. The central openings of the end plates 85 are enclosed by end caps 86 which are connected to the respective end plates 85 by bolts 87.

A shaft 88 extends through the openings in the end plates 85 and is journalled within bearing assemblies 89 mounted within the end caps 86. One end of the shaft 88 is connected by a spline connection to the drive shaft of a motor 90. It is contemplated that in some instances the shaft 88 may be connected to a handle, rather than a motor, so that the shaft can then be rotated manually.

A pair of eccentrics 91 and 92 are keyed on the ends of the shaft 88 and, as described in the previous embodiments, eccentrics 91 and 92 are displaced angularly from each other. The eccentric 91 is journalled within the central opening in a gear unit 93 by a bearing assembly 94 and similarly, the eccentric 92 is journalled within the central opening of a gear unit 95 by a bearing assembly 96.

The gear units 93 and 95 each include an inner gear 97 which engages a fixed gear ring 98 formed integrally with the end plate 85. In addition to the inner gear 97, each gear unit 93 and 95 is provided with an outer and larger gear 99 which engages the rotatable gear ring 100.

The gear units 93 and 95 operate in a manner similar to that described with respect to gear unit 23 in the first embodiment. The teeth of the gears 97 are identical in size and shape to the teeth of the gear rings 98, but the gears 97 contain a lesser number of teeth than the gear rings 98. Similarly, the gears 99 have teeth of the identical size and shape to the teeth of gear rings 100, but the gears 99 contain a lesser number of teeth than the gear rings 100. The difference in number of teeth between the gears 99 and the gear rings 100 is the same as the difference in number of teeth between the gears 97 and the gear rings 98.

The rotatable gear ring 100 is connected to an annular plate 101 by bolts 102, and the inner end of plate 101 is attached to sleeve 103 by spline 104 and by a series of bolts 105 so that plate 101 as well as sleeve 103 rotate with the gear ring 100.

Gear ring 100 is journalled for rotation within the flange 106 of end plate 85 by a ball bearing assembly 107. In addition, plate 101 and sleeve 103 are journalled around shaft 88 by bearing assembly 108, and bearing assembly 109, respectively.

The sleeves 103, which rotate with the gear rings 100, are connected to a rotatable drum 110 through a clutch assembly 111. The drum 110 of the winch is journalled for rotation by a pair of bearing assemblies 112 which are located between the drum and the annular plates 101. A cable 113 is secured to the drum 110 and is adapted to be wound and unwound on the drum through rotation of the drum.

The clutch assembly 111 includes a series of clutch discs 114 which are keyed to the outer surfaces of the sleeves 103, and clutch discs 114 are interspaced between clutch discs 115 carried by drum 110. Located centrally of the interspaced series of clutch discs is a fixed disc 116 which is secured to drum 110.

Clutch discs 114 are free to move axially of sleeves 103, and similarly clutch discs 115 can move axially with respect to the drum 110. To urge the clutch discs 114 and 115 axially inward toward fixed discs 116 and provide a driving connection between sleeves 103 and drum 110, annular plate 117 is splined to each sleeve 103 and a series of coil springs 118 act against each plate 117 and force the plate 117 against the clutch discs. The outer end of each spring 118 is received within a recess in the end of plate 101, and the spring pressure can be varied by rotating adjusting stud 119, the inner end of which bears against a spring rod 120 that is engaged with the outer end of spring 118.

In some situations it may be desirable to independently release the drum 110 and cable 113, as for example, if the hydraulic line to motor 90 should break or if a malfunction of the speed reducing mechanism should occur. To independently release the drum 110, a provision is made to disengage the clutch assembly 111 through a hydraulic system separate from that which is connected to motor 90. In this regard, a cap 121 is secured by bolts 122 to the outer end plate 86, and a tube 123 is disposed within a central recess in cap 121 and communicates with the axial passage 124 in shaft 88. Cap 121 is also provided with a radial inlet passage 125 which is connected to a source of hydraulic fluid.

As shown in FIG. 7, two series of radial passages 126 are connected to the inner end of axial passage 124, and the passage 126 of each series terminate in a circumferential groove 127 which extends around the periphery of the shaft 88.

Each groove 127 communicates with a series of radial passages 128 formed in sleeve 103, and the grooves 127 enable the passages 126 to be in continuous communication with the passages 128 even though the shaft 88 and sleeves 103 are rotating at different rates of speed.

The outer end of each passage 128 is connected by a longitudinal passage 129 to a cylinder 130 and a piston 131 is slidable within the cylinder. The outer end of each piston 131 is engaged with the inner end of a radial pin 132, and the outer end of each pin 132 is received within an opening in annular plate 117.

When hydraulic fluid under pressure is introduced into passage 124 of shaft 88, the fluid pressure acts through passages 126, 128 and 129 and against the pistons 131, moving the pistons as well as the radial pins 132. Outward movement of pins 132, moves plate 117 against the force of springs 118 to thereby release the pressure on clutch discs 114 and 115 and disengage the clutch assembly. The drum 110 can then freely rotate to unwind the cable 113.

The winch mechanism of FIGS. 6 to 9 also incorporate a braking device. As shown in FIG. 9, a brake disc 133 is secured to shaft 88, and the disc 133 is adapted to deflect against the annular surface 134 of the gear unit 93 by a movable ring 135. Ring 135 is mounted in an annular groove 136 in end plate 86 and is biased inwardly toward the brake disc 133 by a series of springs 137 which are located within recesses in the ring. The force of springs 137 deflects brake disc 133 against surface 134 to provide a frictional contact between the fixed end plate 86 and the rotatable gear unit 93, thereby preventing free wheeling of the drum 110.

The braking force is adapted to be released when hydraulic fluid is supplied to motor 90, so that the gear unit 93 can be rotated freely by the motor. To provide the brake release, the end plate 86 is formed with a passage 138, and the outer end of passage 138 is connected through a conduit, not shown, to the hydraulic line leading to motor 90 so that the hydraulic pressure supplied to motor 90 will simultaneously be supplied to passage 138. The inner end of passage 138 communicates with chamber 139 defined by the flange 140 of ring 135 and keeper ring 141. The hydraulic fluid acting in chamber 139 will force the ring 135 outwardly against the force of springs 137 and thereby release the frictional contact between the brake disc 133 and surface 134 of gear unit 93. This construction provides a braking force when the motor 90 is not operating to prevent free wheeling of the drum 110, and automatically releases the braking force when the motor is operated. Moreover, in the event of failure of the hydraulic line to motor 90, the hydraulic pressure in passage 138 will also be removed, so that braking force will be immediately applied through the action of coil springs 137.

The operation of the winch shown in FIGS. 6 to 9 is similar to that previously described. Operation of the motor 90 rotates the shaft 88 to thereby rotate both of the eccentrics 91 and 92. Rotation of the eccentrics acts through gear units 93 and 95 to rotate the gear rings 100 at a reduced rate of speed. Thus, the structure provides a two-stage speed reduction for the drum 110 similar to that previously described.

While the above description has shown the drive mechanism of the invention being used in conjunction with an endless tread and a winch, it is contemplated that the drive mechanism can be employed with any rotating element and, due to the use of the plurality of eccentrics or cranks, the drive mechanism has particular application for high speed rotating elements.

Similarly, while a pair of eccentrics have been shown associated with the drive shaft, it may in some cases be desirable to employ a series of eccentrics.

Various modes of carrying out the invention are contemplated as being within the scope of the following claims particularly pointing out and distinctly claiming the subject matter which is regarded as the invention.

I claim:

1. In a speed reducing transmission unit, a fixed base including a pair of spaced end members, a rotatable input member located between said end members, drive means for rotating said input members, first eccentric means connected to the input member and having a first eccentric surface, a second eccentric means connected to the input member and disposed axially of said first eccentric means and having a second eccentric surface, the maximum radial distance between the center of rotation of said first eccentric means and said first eccentric surface being angularly displaced from the maximum radial distance between the center of rotation of said second eccentric means and said eccentric surface, a pair of axially disposed floating gear units with each gear unit having an opening to rotatably receive one of said eccentric means, each floating gear unit including a first gear and a second gear, an annular flange on each end member, a first fixed gear ring on one of said flanges and disposed to be engaged by the first gear of one of said gear units, a second fixed gear ring on the other of said flanges and disposed to be engaged by the first gear of the other of said gear units, a rotatable gear ring disposed to be engaged by the second gear of each gear unit, bearing means disposed between the outer surface of each flange and said rotatable gear ring for journalling said rotatable gear ring with respect to said end members, and an output member connected to said rotatable gear ring and driven thereby, each first gear having a lesser number of teeth than the corresponding fixed gear ring and each second gear having a lesser number of teeth than said rotatable gear ring, rotation of said eccentric means acting to rotate the respective gear units in the opposite direction and at a reduced rate of speed rotation of said gear units acting to rotate said rotatable gear ring and said output member in the opposite direction and at a further reduced rate of speed.

2. The unit of claim 1, wherein said drive means is mounted on said fixed base.

3. The unit of claim 1, wherein the first gear has a lesser number of teeth than the second gear and the teeth of the first gear and the second gear are substantially identical in size and shape.

4. The unit of claim 1, wherein the first gear of one gear unit has the same number of teeth as the first gear of the other gear unit.

5. The unit of claim 1, wherein said input member comprises a shaft journalled in said end members.

6. The unit of claim 1, wherein said output member is a drive sprocket.

7. The unit of claim 1, wherein the axial length of the teeth of said rotatable gear ring is greater than the sum of the axial lengths of the teeth of said second gears.

8. The unit of claim 1, wherein said first gear of each gear unit has a smaller diameter than the second gear of that gear unit and is disposed axially outward of the second gear of that gear unit and said second gears are disposed in a back-to-back relation.

9. The unit of claim 1, wherein said angular displacement is approximately 180°.

10. In a speed reducing transmission unit, a fixed base, a fixed support member spaced from the base, a rotatable input member journalled for rotation with respect to said base and said support member, drive means for rotating said input member, first eccentric means connected to the input member and having a first eccentric surface, second eccentric means connected to the input member, and having a second eccentric surface, the maximum radial distance between the center of rotation of said first eccentric means and said first eccentric surface being angularly displaced from the maximum radial distance between the center of rotation of said second eccentric means and said second eccentric surface, a pair of floating gear units disposed in the space between said base and said support member with each gear unit having an opening to rotatably receive one of said eccentric means, each floating gear unit including a first gear and a second gear, a first fixed gear ring connected to said base and disposed to be engaged by the first gear of one of said gear units, a second fixed gear ring connected to said support member and disposed to be engaged by the first gear of the other of said gear units, a rotatable member including a gear ring disposed to be driven by the second gear of each gear unit and said rotatable member also including a third gear, a second rotatable gear ring spaced radially outward of said third gear to provide an annular clearance therebetween, a series of drive members located in circularly spaced relation within said annular clearance and engaged with said third gear and with said second rotatable gear ring, connecting means connecting said support member with said fixed base and extending within said annular clearance between said drive members, and an output member connected to said second rotatable gear ring to be driven thereby.

11. The structure of claim 10, wherein said drive members are pinions journalled for rotation between said fixed base and said support member.

12. In a speed reducing transmission unit, a fixed base, a fixed support member spaced from the base, a rotatable input member, drive means for rotating said input member, eccentric means connected to the input member, a floating gear unit having an opening to rotatably receive said eccentric means, said floating gear unit including a first gear and a second gear, first fixed gear ring connected to the base and disposed to be engaged by the first gear of said gear unit, a rotatable member including a second gear ring disposed to be engaged by the second gear of said gear unit, said rotatable member also including a third gear, a third rotatable gear ring spaced radially outward of said third gear to provide an annular clearance therebetween, at least one drive member located within said annular clearance and engaged with said third gear and with said third gear ring, connecting means connecting said support member with said fixed base and extending within said annular clearance, and an output member connected to said third rotatable gear ring to be driven thereby.

13. The structure of claim 12, wherein said drive member comprises a series of circularly spaced pinions journalled for rotation with respect to said base and said support member, and said connecting means extends within the space between said pinions.

References Cited

UNITED STATES PATENTS

| | | | |
|---|---|---|---|
| 1,867,492 | 7/1932 | Braren | 74—804 |
| 2,042,674 | 6/1936 | Martin | 74—805 X |
| 2,966,808 | 1/1961 | Grudin | 74—805 X |
| 3,056,315 | 10/1962 | Mros | 74—805 |
| 3,145,585 | 8/1964 | Brown | 74—805 |
| 3,369,672 | 2/1968 | Lorence | 74—805 X |

ARTHUR T. McKEON, Primary Examiner

UNITED STATES PATENT OFFICE
CERTIFICATE OF CORRECTION

Patent No. 3,534,636　　　　　　　　Dated October 20, 1970

Inventor(s) Ervin W. Lorence

It is certified that error appears in the above-identified patent and that said Letters Patent are hereby corrected as shown below:

Column 2, line 23, "cam" should read -- cab --. Column 3, line 3, "9" should read -- 19 --.

Signed and sealed this 9th day of March 1971.

(SEAL)
Attest:

EDWARD M. FLETCHER, JR.　　　　　　WILLIAM E. SCHUYLER, JR.
Attesting Officer　　　　　　　　　Commissioner of Patents